United States Patent
Messer

(10) Patent No.: US 7,020,622 B1
(45) Date of Patent: Mar. 28, 2006

(54) TRANSACTION TRACKING, MANAGING, ASSESSMENT, AND AUDITING DATA PROCESSING SYSTEM AND NETWORK

(75) Inventor: Stephen Dale Messer, New York, NY (US)

(73) Assignee: Linkshare Corporation, New York, NY (US)

( * ) Notice: Subject to any disclaimer, the term of this patent is extended or adjusted under 35 U.S.C. 154(b) by 0 days.

(21) Appl. No.: 09/558,356

(22) Filed: Apr. 26, 2000

Related U.S. Application Data

(63) Continuation-in-part of application No. 09/098,860, filed on Jun. 17, 1998, which is a continuation-in-part of application No. 08/871,921, filed on Aug. 10, 1997, now Pat. No. 5,991,540.

(51) Int. Cl.
*G06F 17/00* (2006.01)
(52) U.S. Cl. .................................................... 705/26
(58) Field of Classification Search ............ 709/203, 709/217; 705/14, 26, 27
See application file for complete search history.

(56) References Cited

U.S. PATENT DOCUMENTS

| | | | |
|---|---|---|---|
| 4,674,041 A * | 6/1987 | Lemon et al. ............ | 705/14 |
| 4,941,090 A | 7/1990 | McCarthy | |
| 5,117,355 A | 5/1992 | McCarthy | |
| 5,202,826 A | 4/1993 | McCarthy | |
| 5,319,542 A | 6/1994 | King, Jr. et al. | |
| 5,537,314 A | 7/1996 | Kanter | |
| 5,590,197 A | 12/1996 | Chen et al. | |
| 5,692,206 A | 11/1997 | Shirley et al. | |
| 5,708,780 A * | 1/1998 | Levergood et al. .... | 395/200.12 |
| 5,710,884 A | 1/1998 | Dedrick | |
| 5,712,979 A | 1/1998 | Graber et al. | |
| 5,715,314 A | 2/1998 | Payne et al. | |
| 5,715,315 A | 2/1998 | Handelman | |
| 5,717,860 A | 2/1998 | Graber et al. | |
| 5,724,424 A | 3/1998 | Gifford | |
| 5,745,681 A | 4/1998 | Levine et al. | |
| 5,796,952 A | 8/1998 | Davis et al. | |
| 5,812,769 A | 9/1998 | Graber et al. | |
| 5,819,285 A | 10/1998 | Damico et al. | |
| 5,848,396 A | 12/1998 | Gerace | |
| 5,855,008 A | 12/1998 | Goldhaber et al. | |
| RE36,116 E | 2/1999 | McCarthy | |
| 5,873,076 A * | 2/1999 | Barr et al. .................. | 707/3 |
| 5,937,392 A | 8/1999 | Alberts | |
| 5,948,016 A | 9/1999 | Jang | |
| 5,991,735 A | 11/1999 | Gerace | |
| 5,991,740 A | 11/1999 | Messer | |
| 6,006,197 A | 12/1999 | d'Eon et al. | |
| 6,016,504 A | 1/2000 | Arnold et al. | |

(Continued)

FOREIGN PATENT DOCUMENTS

JP 02004157952 A * 6/2004

OTHER PUBLICATIONS

IBM Technical Disclosure Bulletin; Title: Dynamically matching coupons from targeted competitors; Aug. 2001; TDB-ACC-NO: NNRD448158.*

(Continued)

*Primary Examiner*—Elisca Pierre Eddy
(74) *Attorney, Agent, or Firm*—Morgan, Lewis & Bockius LLP; James M. Bollinger; Steven D. Underwood

(57) ABSTRACT

An improved processing system for tracking commerce on the Internet provides for subvariable processing and includes web page scanning to discern fraud or improper content to insure proper promotion of select products within the network environment.

5 Claims, 5 Drawing Sheets

U.S. PATENT DOCUMENTS

| | | | |
|---|---|---|---|
| 6,029,141 | A | 2/2000 | Bezos et al. |
| 6,041,309 | A | 3/2000 | Laor |
| 6,047,327 | A | 4/2000 | Tso et al. |
| 6,173,271 | B1 | 1/2001 | Goodman et al. |
| 6,226,618 | B1 | 5/2001 | Downs et al. |

OTHER PUBLICATIONS

Selected document from internet.com Web site entitled "DoubleClick, 24/7 Media, L90 Settle Patent Suits" by Pamela Parker, downloaded and printed Jan. 18, 2001 (3 pages).
Search results on Internet related patents.
Abstract of United States Patent No. 5,537,314.
John A. Quelch, "The Internet and International Marketing," Sloan Management Review, v37, n. 3, pp. 60-75, Spring 1996.
Selected documents from books.com Web site describing Book Stack's-Unlimited's Links Partner Program, downloaded and printed Jun. 20, 1997 and Jun. 23, 1997 (8 pages).
Selected document from Incognito Café Web site describing several on-line Bookstore Links, undated (5 pages).
Full text article from Dialog search titled "Booksite launches version 3.0 of the popular electronic commerce web site", Business Wire, Feb. 23,1996, p. 02231111 (2 pages).
Full text article from Dialog search titled Amazon.Com Introduces 'Amazon.Com Associates'—A New Model for Internet-Based Commerce, Business Wire, Jul. 18, 1996, p. 07181040 (3 pages).
Text journal article for Dialog search titled "Can mixing 'cookies' with online marketing be a recipe for heartburn?" for Foster, Ed, InfoWorld, v18n30 PP:54, Jul. 22, 1996 (2 pages).
Full text journal article from Dialog search titled "Real-Time Travel Info Available Online", Newsbytes News Network, p N/A, Jan. 17, 1995 (2 pages).
Abstract from Dialog search titled "Online growth 'virtualy' untapped; PC vendors taking more advantage of booming sales . . . " by Harrington, Mark, Computer Retail Week, v4, n64, p160 (1), Jun. 6, 1994 (1 page).
Full text titled "GroupLens: An Open Architecture for Collaborative Filtering of Netnews" by Paul Resnick, et al., from Proceedings of ACM 1994 Conference on Computer Supportec Cooperative Work, Chapel Hill, NC: 175-186 (18 pages).
Full text titled "Fab: Content-Based, Collaborative Recommendation" by Marko Balabanovic, et al., Communications of the ACM, Mar. 1997, vol. 40, No. 3 (8 pages).
Kirck, J., "A cookie for your thoughts: cookies help webmaters harness user habits", Computer Shopper, v17, n7, p610(1).
Full text article from Dialog search titled "Networking and the rise of electronic commerce: The challenge for public policy," Business Economic, v30n4, Oct. 1995, p. 01097255 (10 pages).
Bruce Judson, "Luring Advertisers Prospects To The Web", Advertising Age, p. 16, Aug. 7, 1995.

* cited by examiner

TRANSACTION TRACKING, MANAGING, ASSESSMENT, AND AUDITING DATA PROCESSING SYSTEM AND NETWORK

STATEMENT OF RELATED CASES

This application is a continuation-in-part of U.S. patent application Ser. No. 09/098,860 filed Jun. 17, 1998, titled "Transaction Tracking And Assessment Data Processing System And Network" to the present applicant, Stephen D. Messer, which is a continuation-in-part of Ser. No. 08/871,921 filed Aug. 10, 1997 now U.S. Pat. No. 5,991,540 issued Nov. 23, 1999 titled "Data Processing System For Integrated Tracking And Management of Commerce Related Activities On a Public Access Network" also to the present applicant. The present application incorporates the teachings of the above-mentioned application and patent as if restated herein in full.

FIELD OF THE INVENTION

The present invention relates in general terms to a data processing system for integrated management of commerce as transacted on a plurality of interconnected computers. Specifically, the present invention provides for improvements and enhancements to the network computer systems previously disclosed in U.S. patent application Ser. No. 09/098,860, titled "Transaction Tracking And Assessment Data Processing System And Network" to the present applicant, Stephen D. Messer, and in U.S. Pat. No. 5,991,540 issued Nov. 23, 1999 titled "Data Processing System For Integrated Tracking And Management of Commerce Related Activities On a Public Access Network" also to the present applicant. More specifically, the present invention relates to a referral tracking and control system for promoting goods and services on a wide area, public or private access network, such as the Internet.

BACKGROUND OF THE INVENTION

As discussed in more detail in the above-referenced parent cases, the present invention includes the ability to track select USER activity while on the Web including interactions with Web pages and click-through navigation to select Web sites where purchases can be executed. Notwithstanding these advancements and advantages, commerce on the web can still be improved upon. Recognizing some of the current difficulties in implementing affiliate programs has led to the innovations presented herein.

OBJECTS AND SUMMARY OF THE PRESENT INVENTION

It is an object of the present invention to provide a data processing system for tracking, managing, and auditing select transactions between a plurality of computer workstations interconnected via a common network.

It is a further object of the present invention to provide a tool for a Merchant to see if the Content Provider is complying with terms of promotional arrangement between the parties.

It is still another object of the present invention to provide a vehicle for the detection of affiliate sponsored fraud; exemplary fraud of concern includes use of a process that employs a Javascript to artificially multiply the number of clicks, impressions and/or sales on a banner or similar promotional piece.

It is another object of the present invention to provide a system for encoding links with Merchant specific codes, i.e., codes that are used by Merchants for individual tracking of customers.

It is still another object of the present invention to provide real time translation of internal link-based data transfers, i.e., to map the internal code used in a prior affiliate program to the new code regimen for the current affiliate program. This is applicable for retaining and applying pre-existing coding regimens when switching to new program manager.

It is yet another object of the present invention to provide a system for tracking select data stored in link U1 data field, comprising USER and/or site information provided in name: value pairs. Two mechanisms are employed to collect data for the database. The first approach tracks USER visits using cookies to determine Web path; alternatively, incentive forms that use a promotional contest to gain voluntary input of data can be applied to collect USER/site data. Once established, closed looped marketing permits targeting of ads to particular Users based on the stored profile. Configured appropriately, this will also support single click purchases utilizing stored data on purchase requirements from the first Merchant, applicable to each subsequent Merchant visited by the USER.

It is another object of the present invention to provide a system that allows Users to control the destiny of a portion of the purchase price for a particular good or service purchased on the Internet. A web site is provided to allow its members to donate a portion of the referral commission to the charities of their choice with each online purchase.

It is also an object of the present invention to target and track affiliate web sites with loyalty-building programs and charity sites in order to reallocate an established percentage of every transaction.

It is also an object of the present invention to provide an identifier at the end of a URL address and allow for improved data processing for tracking and managing select transactions between a plurality of computer workstations interconnected, via a common network.

In order to accomplish these and other objects, the present invention includes a data processing system designed and configured to operate on one or more servers interconnected for communication. The data processing system includes a Clearinghouse server programmed to track, manage, and audit associated transactions of Users clicking-through an Content Provider web site and purchasing a product or service from a Merchant. The Clearinghouse server is also programmed to track and report on the level of activity associated with the Users and produce, on a periodic basis, accounting statements for the participants directed to the transactions that have transpired during the defined period. The Clearinghouse server is further programmed to incorporate the use of select tagging of information to permit tracking of web site visitors and for tracking and recording the specific transactions under scrutiny. The identifier typically includes a select coded data and may take the form of a "cookie" (or similar tracking device) that is inserted onto the User's hard disk memory during access to the link. The Clearinghouse server is further programmed to provide a platform for Merchants and Content Providers to efficiently reach terms on their joint promotional and commercial efforts, and for each, to internally monitor these relationships.

The present invention also includes the use of segregated data processing system having a plurality of discrete sites individually programmed to operate in concert to monitor and track transactions between related entities and provide remuneration to the participants in accordance with a predetermined set of transaction criteria. To insure proper implementation of the promotional arrangements between parties, the system further optionally employs a web—spider that travels to select sites and downloads Content Provider page(s) to determine content. Analysis is then performed to determine if the content includes inappropriate material or subject matter inconsistent with the promotional arrangement. The system further and optionally includes fraud detection processes which detect Javascript on the affiliate's page that automatically triggers and loops the web page linking codes, artificially creating multiple "clicks" on the promotion.

Other objects, features, and advantages of the invention shall become apparent as the description thereof proceeds when considered in connection with the accompanying illustrative drawings, detailed description of the specific embodiments, and the appended claims.

BRIEF DESCRIPTION OF THE FIGURES

In the drawings which illustrate the best mode presently contemplated for carrying out the present invention.

DETAILED DESCRIPTION OF THE INVENTION

First, briefly in overview, the present invention involves the use of a data processing system having a plurality of discrete sites individually programmed to operate in concert to monitor and track transactions between related entities and provide a remuneration to the participants in accordance with a pre-determined set of transaction criteria. The system may be better understood by its use in support of transactions on the Internet.

The Internet is populated with a large number of web sites, each managed and configured to provide information to visitors browsing the web. Some web sites considered "Content Providers" (or "Site Owners" as previously described in the parent cases mentioned above), include one or more web pages having information that is of interest to USERS during a browsing session. Content Providers may become Affiliates as described in further detail below.

Figure 1:
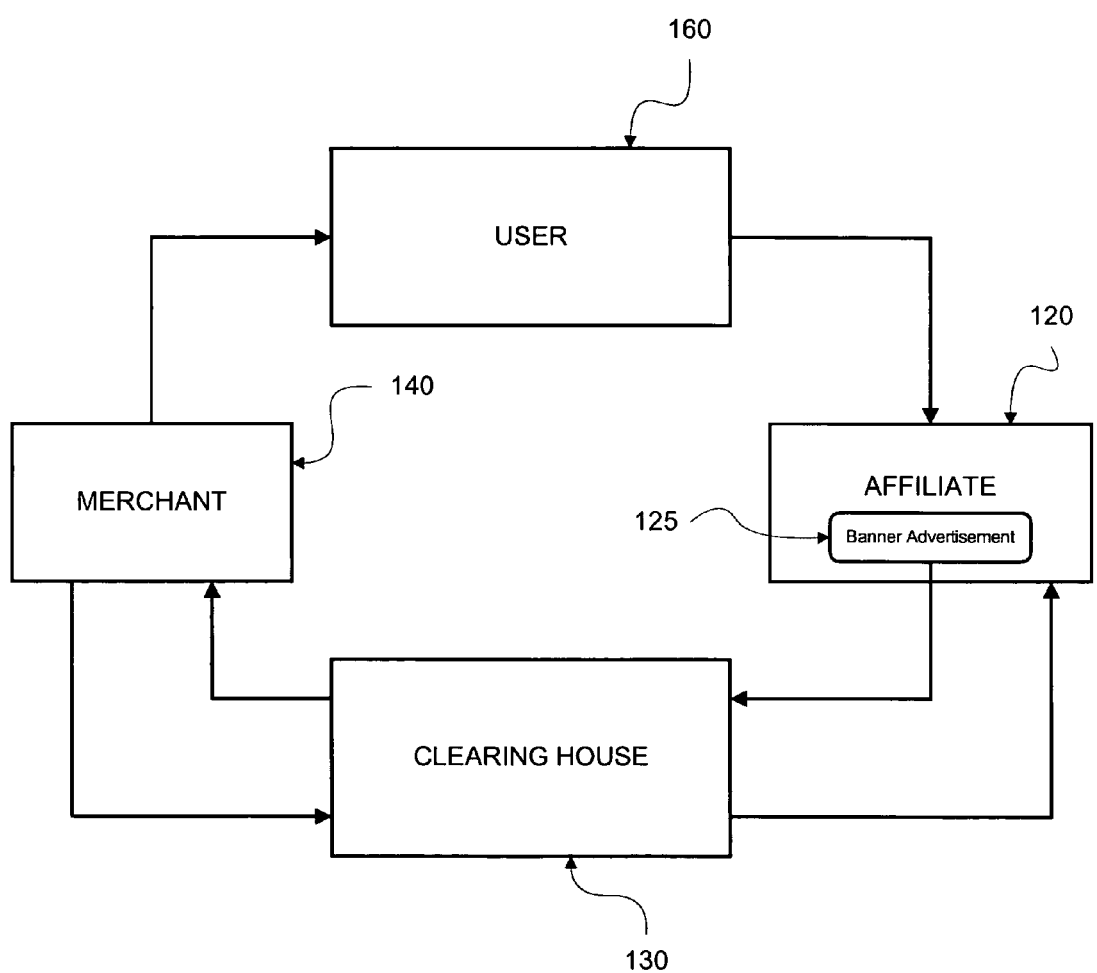
FIG. 1 is a schematic block diagram providing an overview of the system.

Referring to FIG. 1, the USER typically will access the Internet via a modem connection or a local area network connection. The USER begins the process by using a web browser, such as Microsoft's Internet Explorer™ or Netscape Navigator™ to visit an Affiliate web page, block 120, such as one of the main web pages that include articles on current events, business news, sports, personal finance, etc. Importantly, the Affiliate or Site Owner includes a rich array of interesting subject matter capable of drawing substantial traffic to the site during operation. In addition, the Affiliate has allocated space among the various web pages that can be made available for banner type ads or similar. On this web page, a banner ad (text link or icon) block 125, is displayed to the USER promoting products or services at an attractively discounted price. Finally, it is expected that the Affiliate further provides text-based or other promotional vehicles for use in advertising practice.

The banner ad is linked, first in a seamless fashion to the Clearinghouse server, block 130. The link then continues directly to the Merchant block 140 (as shown by inner path in FIG. 1). During the linking process, the USER has an identifier string appended to the HTTP entry, and possibly a "cookie" placed on their system. These act as a marker to permit tracking of the USER by the Clearinghouse, to determine if and when the USER was involved in a purchase, and if to allocate a purchase commission to the Affiliate. The identifier used with select Affiliates include data fields for use to track select information such as a commission vector, i.e., a magnitude and direction for commission dollars generated by that USER's commerce activity on the Web. This will include, perhaps, a charity wherein subsequent purchases by that USER will trigger commissions, a portion of which are contributed to the charity on periodic basis. The charity—one of selectable vectors—is known as the "Target ID". In other embodiments, the USER can request that a portion of the commission be donated to a school, other individuals, or even a personal investment account as part of a coupon redeeming or "cash back" algorithm. A USER will likely return to the Affiliate since any purchases made when clicking-through the Affiliate will result in a donation to the USER's charity of choice and possibly a reduced purchase price, hence creating USER loyalty.

The hub of operation is the Clearinghouse server, 130 linked for interconnection and communication with the network and, in particular, any Merchants and Affiliates interested in formalizing ad programs based on the precepts of the present invention. The Clearinghouse server is equipped with processing power and memory sufficient to meet the demand of multiple subscribers and click-through traffic from Affiliate promotions. In its preferred embodiments, the server is configured with a UNIX operating system. Database management software utilizing Oracle® on an Apache® Webserver is configured for the specific operating system environment. As discussed below, the Clearinghouse is further equipped to deter fraud and other non-productive activity.

Finally, the Merchant server 140, is similarly linked to the network. The Merchant server is also advantageously configured with the UNIX operating system. Merchants submit text file reports back to the Clearinghouse regarding Affiliate triggered commerce. In addition, the goods are delivered to the USER.

As discussed previously, after information is received about the purchase at the Clearinghouse server, a commission determination is calculated. The commission will be a factor of several variables including the original arrangement worked out between the Merchant and the Site Owner, and the qualification of the USER in terms of access to the Merchant site, i.e., whether that USER had been directed to the Merchant site by more than one banner ad before the purchase was made.

If so, a sharing or priority plan may be required. Once these terms have been implemented, final accounting for the Merchant and Affiliate is implemented including payment of commission and recording all transaction details. In this way, valuable records detailing the activity of select banners in terms of revenue are created allowing for accurate assessment of promotional impact.

On the Merchant's side, products and services are organized with identifier codes, known as skus. The sku's assist in tracking the products for the Merchants' inventory control and the like. The database comprising product sku's is formatted and sent to the Clearinghouse for posting. When USERs interact with Affiliates and ultimately the supplying Merchants, the links trigger the placement of code including sku values on the USER command line allowing for more precise product tracking capabilities.

Merchant's may build commerce tracking links recognizable by the Clearinghouse through programming residing on the Clearinghouse server. Specifically, a URL for a product offered on the Merchant site is copied to the clipboard of the computer. A specific web page on the Clearinghouse server is then accessed and the product URL on the clipboard is ""pasted" on the designated location of the page. In addition, the Merchant can copy and paste images relating to the product, or alternatively type in descriptive information in the designated fields of the Clearinghouse web page dedicated to link creation. Once the specific information is placed, the Clearinghouse server, via Javascript, Perl and/or "C" programming, generates the operative link, including all parameters necessary to implement commerce tracking. This is accomplished via a stored database on the Clearinghouse server comprising the input/output link conversion criteria for each Merchant associated with the Clearinghouse.

In operation, tracking parameters, including site ID and session ID will be encrypted. The purpose of this is to prevent extraction by unauthorized entities (web robots, search engines, etc.) of traffic, and commerce patterns of select sites. For example, the following HTTP link includes an encrypted ID:

$$\text{http://click.linksynergy.com/fs-bin/stat?id=1Mh2Xiq9×NO\&offerid=2164\&}u1=1234 \quad (1)$$

Here the "id" is a site ID for an Affiliate, and the value is encrypted using a 128 bit secret key algorithm and Base 64 binary to ASCII encoding, however, other encryptive algorithms may be used. On arrival to the Clearinghouse, the system interprets the encrypted ID and then redirects the click-through to the appropriate Merchant, retaining the ID in encrypted format. This link is for a single variable placed in the U1 field, and uses the standard HTTP name/value pair format. The foregoing link may be modified to include multiple subvariables, all placed in the U2 field. This is exemplified in Equation 2:

$$\text{http://click.linksynergy.com/fs-bin/stat?id=1Mh2Xiq9×NO\&offerid=2164\&u1=member\%3D1234\%26page\%3Dpets} \quad (2)$$

In the foregoing HTTP statements appended to the URL, the fs-bin is the path; stat is a program for reading the rest of the string; "?" a separator; the first id is the Content Provider identifier; "offerid" is the Merchant offer—commission structure; and the U1 field is a name:value pair, wherein ampersands are used as separators. The U1 string in Equation 2 above appears as name:value pairs:

$$\text{member=1234\&page=pets} \quad (U1)$$

During processing of the U1 field, an escape function converts the "=" into hexadecimal form, i.e. "%3D" and "&" into "%26" of the U1 above, generating the string as shown in Equation 2 above. This permits processing of the subvariables in the U1 field in accordance with the requirements of the Content Providers—with the Clearinghouse server populating reports with these values and reporting these back to the Content Providers at select intervals. Exemplary subvariables will include member and page identifiers, and select numerical indicia.

Figure 2:
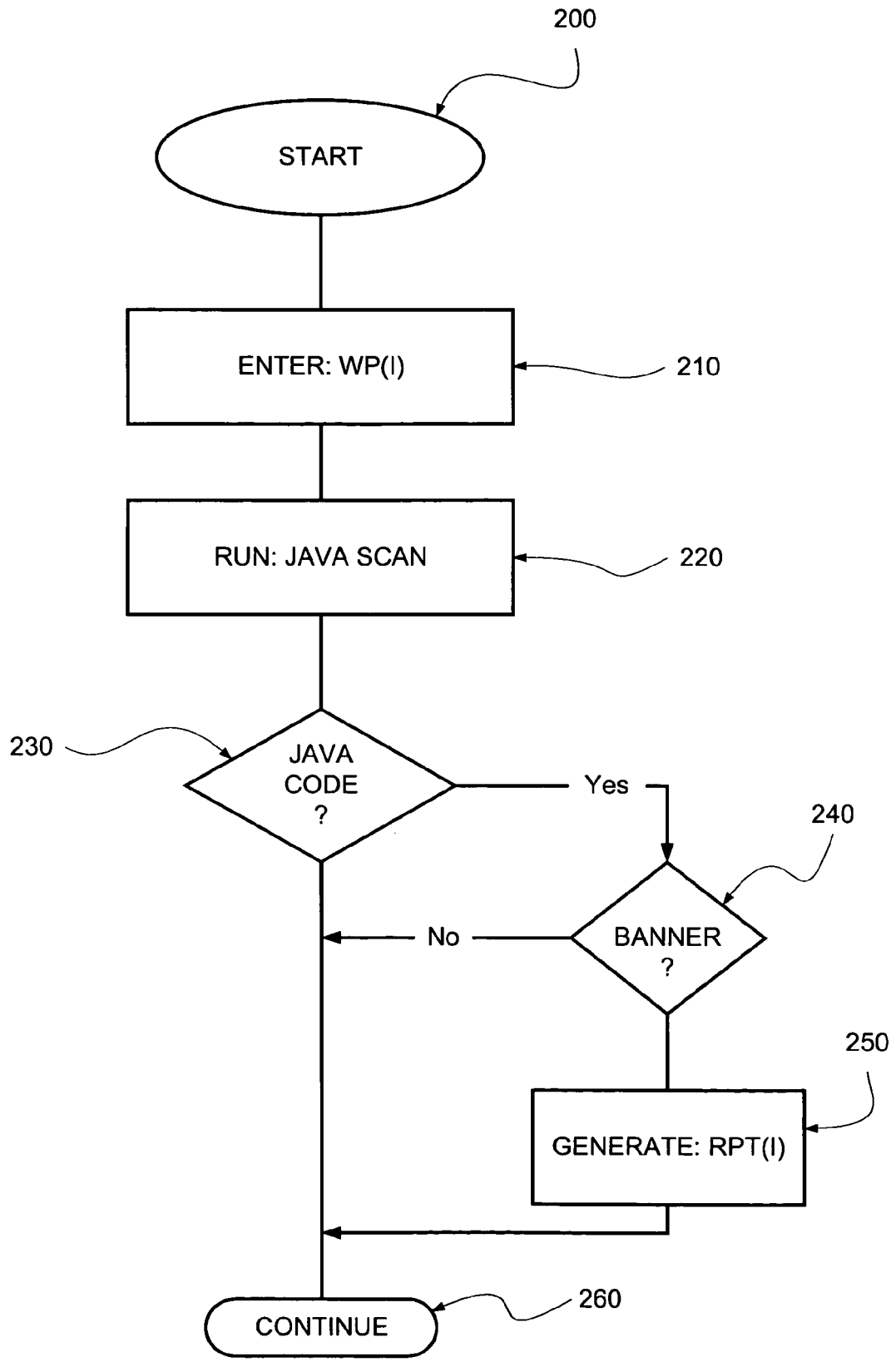
FIG. 2 is a logic flow diagram of the flow detection system.

Turning now to FIG. 2, a high level flow chart depicts the programming logic for detecting click fraud. Logic begins at start block 200 and the system at block 210, pulls and enters the next web page in sequence. With the large number of affiliate web pages makes a sequential review perhaps too involve. Accordingly, the system may use a number of sampling techniques, that provide some policing capability. In this way, counter variable I increments the sampled pages and sends these to the scanning program, block 220.

At Test 230, the scanned page is examined to determine if Javascript exists within the page content. Javascript may be used to produce a click-loop process, wherein the promotion linking codes are repeatedly triggered by the Javascript commands. This would create the illusion of many clicks on the promotion by users. However, these clicks would have telltale signs, such as originating from the same IP address, identical patterns, time intervals, and the like. A positive detection branches logic to the next Test, 240 for detecting the existence of the Javascript in association with the promotion vehicle, e.g. a banner ad. If this test is also positive, the system generates a report, positively identifying the page as a potential source of click fraud., block 250. Logic then continues at 260.

In addition to the Javascript detection algorithm, the system further tracks potential click fraud by assessing historical patterns of commerce. For example, if a click-through includes the same ID, the system measures the interval between successive clicks. A relatively fast click speed, or multiple clicks at a uniform interval reflects the possibility that the click is machine generated and potentially fraudulent. Other patterns may give further details, such as large jumps in traffic from individual sites.

For large scale burst traffic generated from a single or a grouped IP address, within a short interval, the apache server of the Clearinghouse is programmed to block such traffic from hitting the database of the ad servers, thus defending the Clearinghouse server from certain types of DOS (denial of service) attacks. Based on these types of detected activity, the system will create a report and trigger further and more comprehensive evaluations.

A similar process is employed in detecting content problems with web pages within the Affiliate network. This accrues when banners for select products are placed oil pages with content that is antithetical to that product. To detect this, the system includes a selective download process for grabbing web pages WP(I) on some appropriate basis, block 210. At block 220, the system pulls a library of keywords that are of particular concern for the product associated with that web page. This may be words associated with heart disease for products such as steaks or cigarettes.

Figure 3:
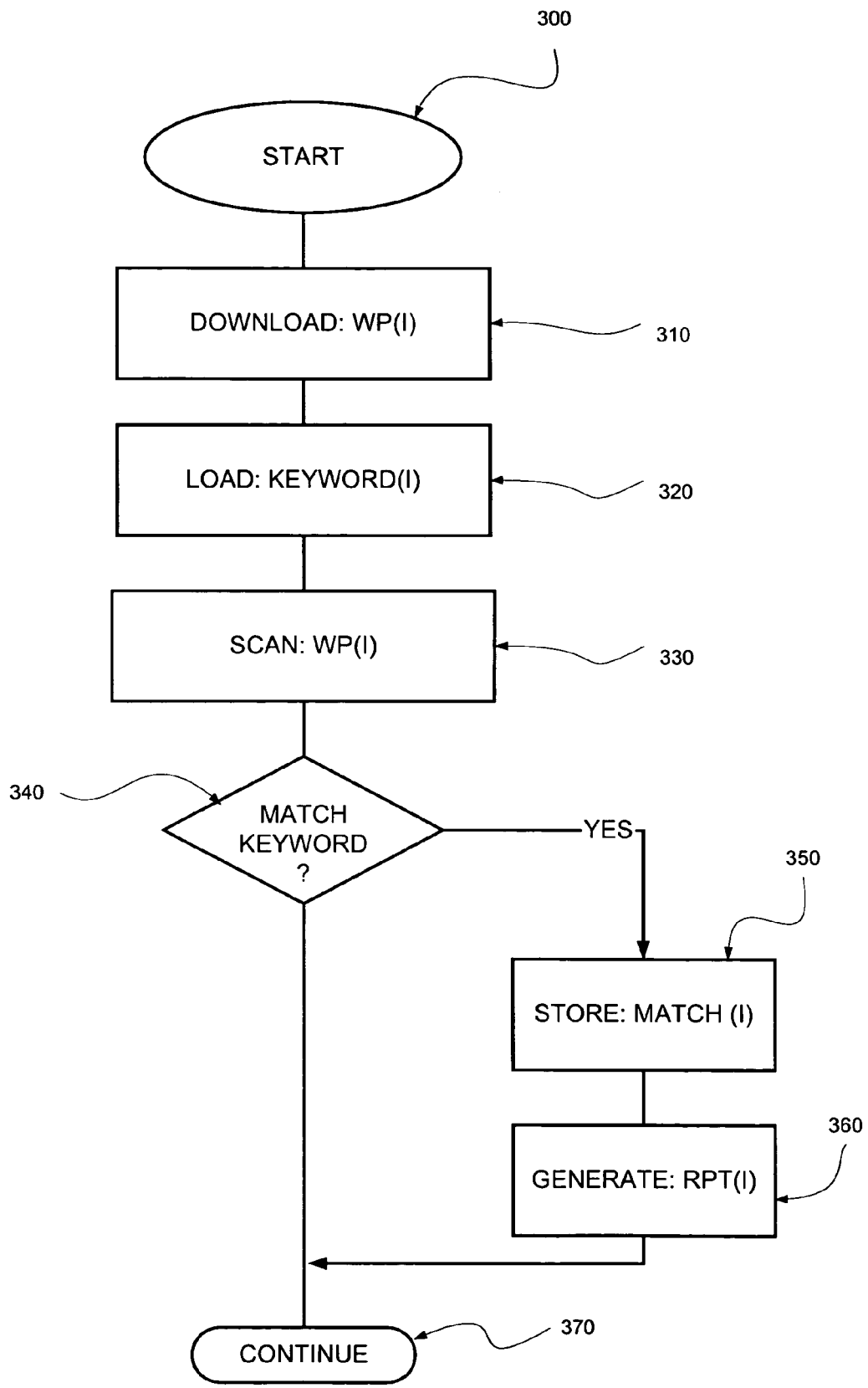
FIG. 3 is a logic flow diagram of the web page analyzer.

Continuing with FIG. 3, the system then scans the web page WP(I) and creates a comparator file from the scanning, block 330. This is then compared to the library of keywords, Test 340 with the positive matches branching logic to block 350, storing the matched keyword. The system then generates a report regarding the match, block 360 and continues the process for the next page and library, block 370.

The allocation of commission dollars to charity may be done via several methods, including a USER and/or site basis. The USER enters a Merchant or Content Provider site and completes a form designating that future purchases made by that USER will trigger commissions payable to a specified target, e.g., a charitable organization such as the American Cancer Society or ACS". Once completed, the form is entered into a database stored locally or at the Clearinghouse server. An identifier is then used to detect subsequent commerce by that USER and, once detected, to allocate the commission to the designated recipient, e.g., ACS. The designation of the target is made in one of the subvariables of the U1 field.

Alternatively, the Content Provider site and/or Merchant site may have local coding that automatically triggers a commission vector to designated recipients, viz., USER commerce, independent of USER data entry. For example, a web page may promote itself as a purchase site for select items stating that all purchases made on that site will incur a commission vector to a selected entity, such as a school. In this way, the University of Nebraska may include a Merchant web page where purchases by USERs trigger the commission vector depositing funds into the school's bank account.

Figure 4:
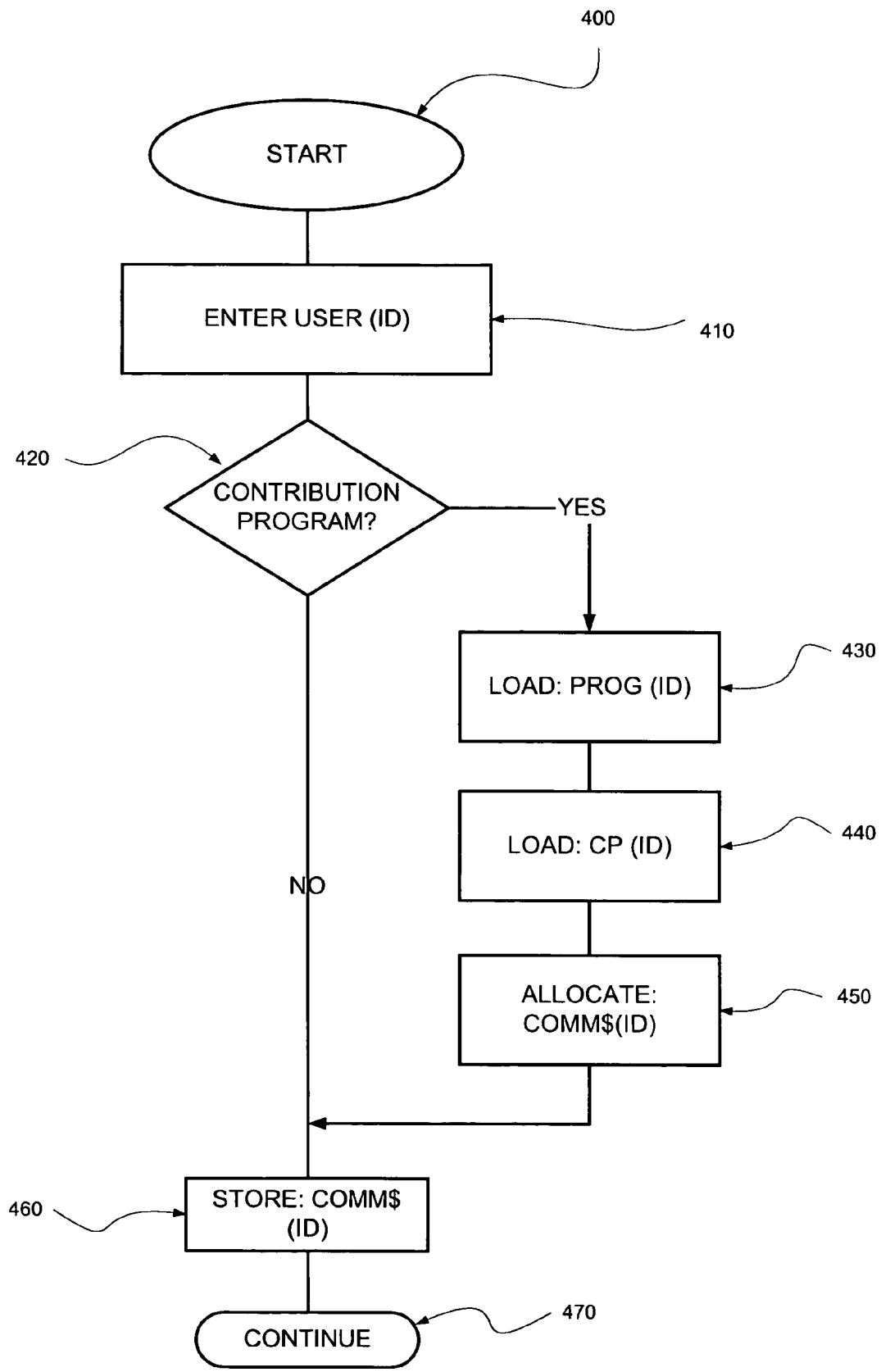
FIG. 4 is a logic flow diagram of the commission vector subsystem.

This is exemplified in FIG. 4. The process starts at block 400, and USER(ID) is tracked, via mechanisms previously discussed herein, to detect purchases that generate a commission CP(ID), block 410. Test 420 determines if the transaction is governed by any contribution program and if the USER is a member; if so, logic branches to block 430 and the system loads the proper commission vector parameters, Prog(ID). The purchase details are loaded, block 440, and the system allocates the commission vector block 450.

In either event, the purchase commission is stored, block 460 and the system increments to the next USER-transaction.

Figure 5:
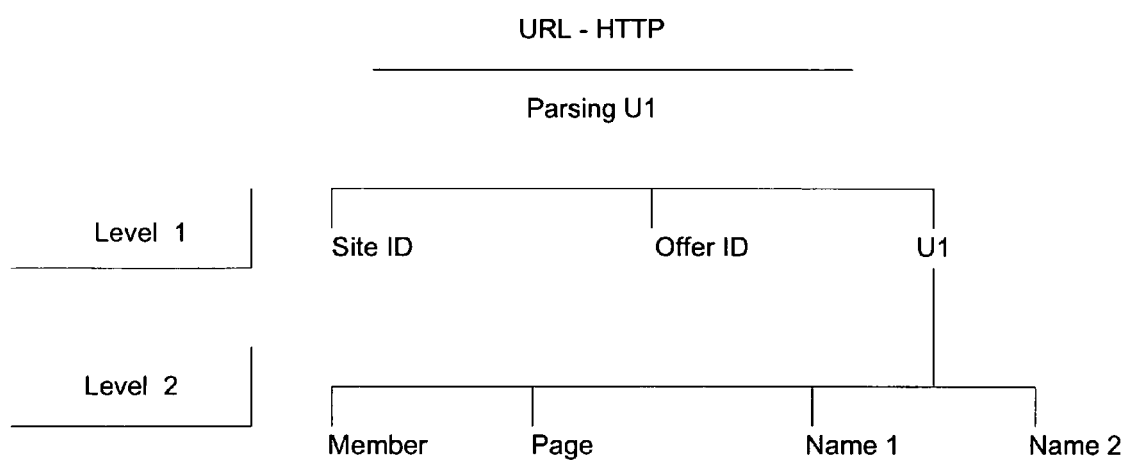
FIG. 5 is a schematic of the variable structure.

Turning now to FIG. 5, a schematic of the levels of coding is provided for the select fields associated with the HTTP command line entry for the link. Level one depicts the three variables, including the U1 field. In accordance with the present invention, the U1 field is populated with sub variables, separated by markers so that the parsing program registers the beginning and end of each subvariable in the U1 field.

As discussed previously, the Merchant will submit information regarding commerce to the Clearinghouse server utilizing a Merchant text file. Select processing characteristics are transferred for implementation, via this Merchant file in a field known as the M1 field within the file. For example, the M1 field may report purchases from first time USERs under a commission structure that rewards the Content Providers for referrals of new customers at a higher rate than repeat customers. This provision is included in the M1 field and used by the Clearinghouse to administer the reporting of commissions to the Content Providers.

A typical Merchant return file is configured with the data as delineated in Table 1 provided below:

TABLE 1

| Time entered | Time completed |
|---|---|
| SKU number | Quantity |
| Price | Currency |
| SiteID | OrderID |
| OrderID | M1 |
| M2 | Flag |

Although the invention has been described in detail for the purpose of illustration it is to be understood that such detail is solely for that purpose and that variations can be made therein by those skilled in the art without departing from the spirit and scope of the invention.

What is claimed is:

1. A data processing system for supporting web-based commerce and commission tracking on a multi-node network, comprising:
 a. one or more Content Providers with web pages wherein said web pages include linking instructions associated with select promotions;
 b. a Clearinghouse server for automatically tracking USER interactions with said promotions, said Clearinghouse server further comprising programming for detecting fraudulent activity relating to said promotions; and
 c. Merchant sites interconnected to said network and available for providing goods and/or services to USERs referred to said Merchant site by said linking instructions.

2. The system of claim 1 wherein said fraud detection programming includes click pattern assessment over time.

3. The system of claim 2 wherein said programming tracks time intervals between clicks from a select promotion.

4. The system of claim 2 wherein said programming detects repeated clicks from a single IP address.

5. The system of claim 1 wherein said fraud detection programming includes Javascript detection.

* * * * *